United States Patent [19]

Schlosser

[11] Patent Number: 5,429,212
[45] Date of Patent: Jul. 4, 1995

[54] PARKING LOCK MECHANISM

[75] Inventor: Kraig J. Schlosser, Fort Wayne, Ind.

[73] Assignee: Dana Corporation, Toledo, Ohio

[21] Appl. No.: 272,768

[22] Filed: Jul. 8, 1994

[51] Int. Cl.6 .............................................. B62C 7/02
[52] U.S. Cl. ..................................... 188/69; 188/31; 188/265
[58] Field of Search ...................... 188/69, 31, 265, 67, 188/60, 158, 161, 162; 475/331; 74/411.5

[56] References Cited

U.S. PATENT DOCUMENTS

| 2,072,764 | 3/1937 | McCoy. | |
|---|---|---|---|
| 2,252,618 | 8/1941 | Campbell. | |
| 2,698,734 | 1/1955 | Tremolada et al.. | |
| 2,746,673 | 5/1956 | Collins. | |
| 2,984,318 | 5/1961 | Mathews. | |
| 3,206,990 | 9/1965 | Uhl. | |
| 3,601,231 | 8/1971 | Kolacz et al. | 188/69 |
| 3,912,050 | 10/1975 | Iwanaga et al. | 188/69 |
| 4,690,252 | 9/1987 | Kottke et al.. | |

Primary Examiner—Douglas C. Butler

Attorney, Agent, or Firm—Oldham, Oldham & Wilson Co.

[57] ABSTRACT

A parking lock mechanism for use in a vehicle drivetrain subassembly having an electric motor coupled to a reduction gear set with the gear set including a rotatable output member having a plurality of circumferentially spaced locking holes. The mechanism comprises a locking pin movably mounted in an end cover structure of the drivetrain subassembly and a cam rotatably mounted in the end cover structure and having an inner portion in contacting engagement with the locking pin. An actuator assembly is provided for applying a torsional load to the cam which urges the locking pin into contacting engagement with the output member when the locking holes are circumferentially misaligned with the locking pin and causes a predetermined rotation of the cam about its longitudinal axis from a released position to an actuated position when one of the locking holes is circumferentially aligned with the pin. The rotation of the cam to the actuated position forces the pin into a releasable locking engagement with the aligned one of the locking holes so as to prevent rotation of the output member of the vehicle drivetrain gear set.

10 Claims, 5 Drawing Sheets

PARKING LOCK MECHANISM

FIELD OF THE INVENTION

The present invention relates generally to a parking lock mechanism and, more particularly, to a parking lock mechanism for use in a small vehicle drivetrain subassembly comprising an electric motor and a reduction gear set.

RELATED ART

Electrically powered motor vehicles are being utilized to a greater extent for a variety of reasons including energy conservation and environmental concerns. Known systems of this type typically include an electric motor which is used in conjunction with one or more planetary gear sets for driving an individual wheel hub or a drive shaft coupled to a conventional axle. Unlike internal combustion engines, electric motors do not offer significant resistance to rotation and accordingly parking features are required in an electrically powered vehicle to prevent undesired movement of the vehicle after the propulsion unit has been shut down. A known application of an electric propulsion unit for use in large commercial vehicles includes a fail safe parking feature provided by the air brakes which are typically used on large commercial vehicles. However, such a system is not practical for smaller vehicles due to the size and weight of the air compressor and associated hardware which would be required.

Other known parking lock systems for use in motor vehicles include those which incorporate dogs or pawls which, when activated, engage the teeth of a rotatable gear of the vehicle drivetrain. Such systems are relatively expensive to manufacture and are known to cause undesirable gear teeth wear which may result in relatively high maintenance costs.

In view of the foregoing disadvantages with prior parking lock mechanisms, applicants' invention is herein invented.

SUMMARY OF THE INVENTION

The present invention is therefore directed to a parking lock mechanism for use in a vehicle drivetrain subassembly having an electric motor coupled to a reduction gear set, with the motor contained within a housing and the gear set enclosed by an end cover structure attached to the housing. The gear set contains a rotatable output member having a plurality of circumferentially spaced locking holes. According to a preferred embodiment of the present invention, the parking lock mechanism comprises a locking pin movably mounted in the end cover structure and a cam rotatably mounted in the cover structure. The cam includes a longitudinal axis and an inner portion in contacting engagement with the pin. An actuator assembly is provided which applies a torsional load to the cam when activated. Activation of the actuator assembly causes a first predetermined rotation of the cam about the longitudinal axis from a released position to an actuated position whereby the cam forces the pin into releasable locking engagement with one of the locking holes when the locking hole is circumferentially aligned with the pin. Engagement of the pin in the locking hole couples the output member to the end cover structure so as to prevent rotation of the output member, which is otherwise free to rotate when the pin is disengaged from the locking hole. Activation of the actuator assembly causes a second predetermined rotation of the cam about the longitudinal axis from a released position to a preloaded position thereby urging the pin into a contacting engagement with the output member when all of the locking holes are circumferentially misaligned with the pin.

A main advantage of the parking lock mechanism of the present invention is that it provides a cost effective means for locking the rotatable output of an electric motor and reduction gear set subassembly, while avoiding undesirable gear teeth wear of the reduction gear set.

BRIEF DESCRIPTION OF THE DRAWINGS

The aforementioned advantage, as well as other advantages of the present invention, will become apparent from the subsequent detail description of the preferred embodiments when taken in conjunction with the accompanying drawings, wherein.

DETAILED DESCRIPTION

Figure 1:
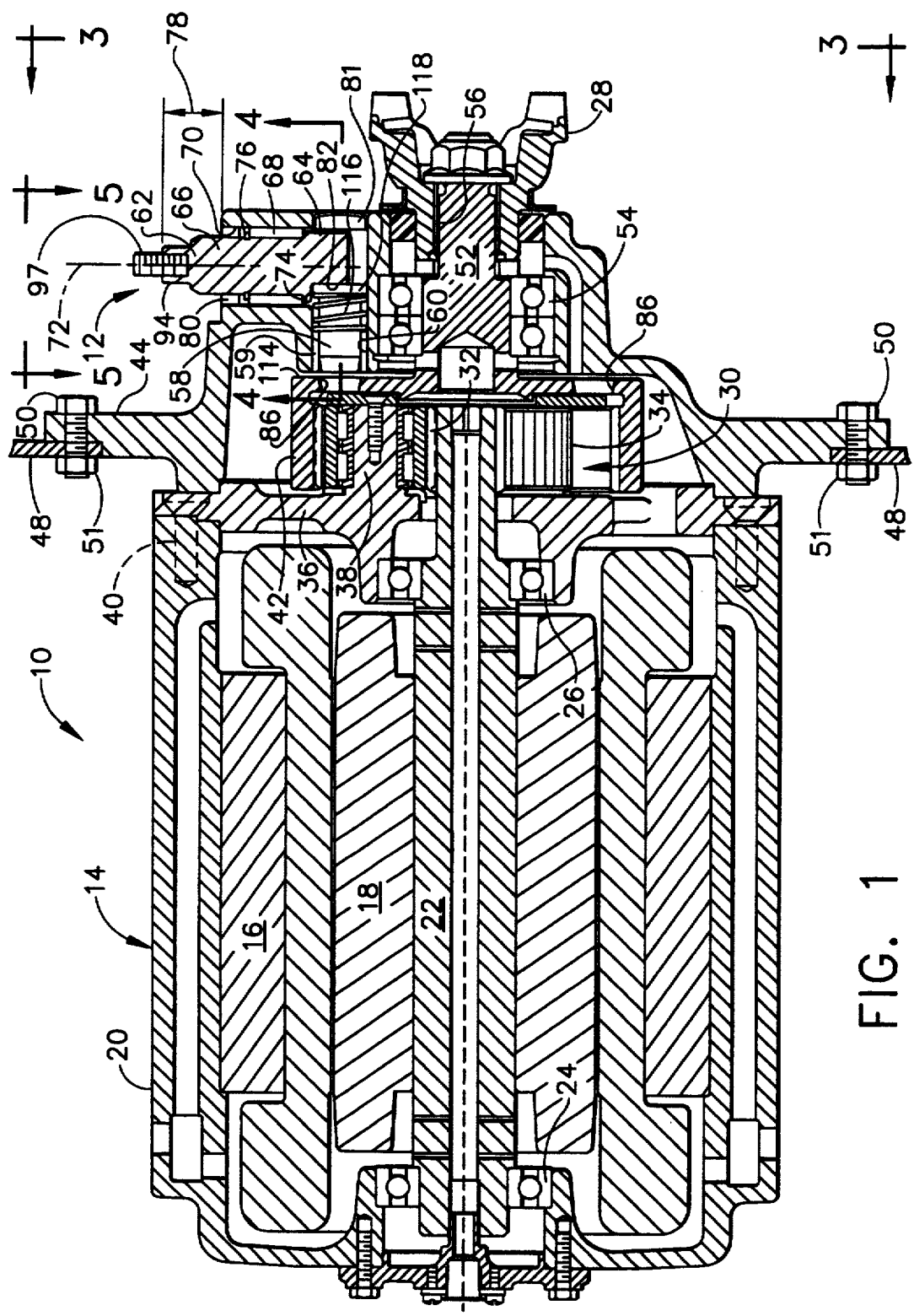
FIG. 1 is a longitudinal cross-sectional view illustrating a motor and reduction gear set subassembly incorporating the parking lock mechanism of the present invention.

Referring now to the drawings, wherein like reference numerals have been used for similar elements throughout, FIG. 1 is a longitudinal cross-sectional view illustrating a vehicle drivetrain subassembly 10 comprising a motor and reduction gear set which incorporates a parking lock mechanism 12 according to the present invention. Subassembly 10 comprises an electric motor 14 which has a stator 16 and a rotor 18 which are enclosed within an exterior housing 20, Rotor 18 includes an output shaft 22 which is rotatably mounted within housing 20 by bearing assemblies 24 and 26 which are disposed at opposite ends of shaft 22. Shaft 22 is rotatably coupled to an output yoke 28 via a planetary gear set indicated generally at 30, causing output yoke 28 to rotate at a reduced speed relative to motor shaft 22. Yoke 28 is rotatably coupled to a drive shaft (not shown) of a motor vehicle (not shown) by conventional means. Electric motor 14 may be an alternating current, induction type motor. During periods when motor 14 is shut down or turned off, the inherent characteristics of motor 14, planetary gear set 30 and yoke 28 do not offer sufficient frictional resistance to prevent yoke 28 from rotating, which may result in undesired movement of the vehicle (not shown). This potential problem is resolved by the parking lock mechanism 12 as subsequently discussed.

Figure 2:
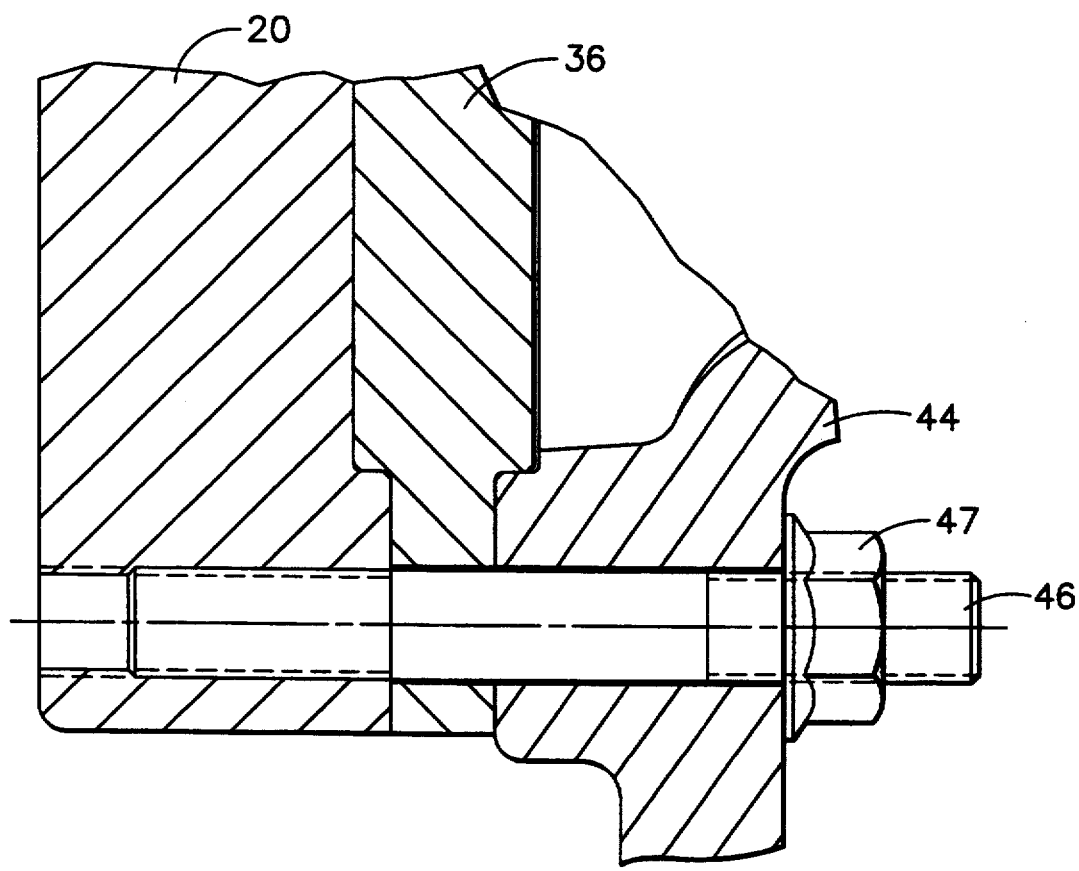
FIG. 2 is an enlarged view illustrating the attachment of the motor housing and reduction gear set planet carrier to the end cover structure shown in FIG. 1.
Figure 3:
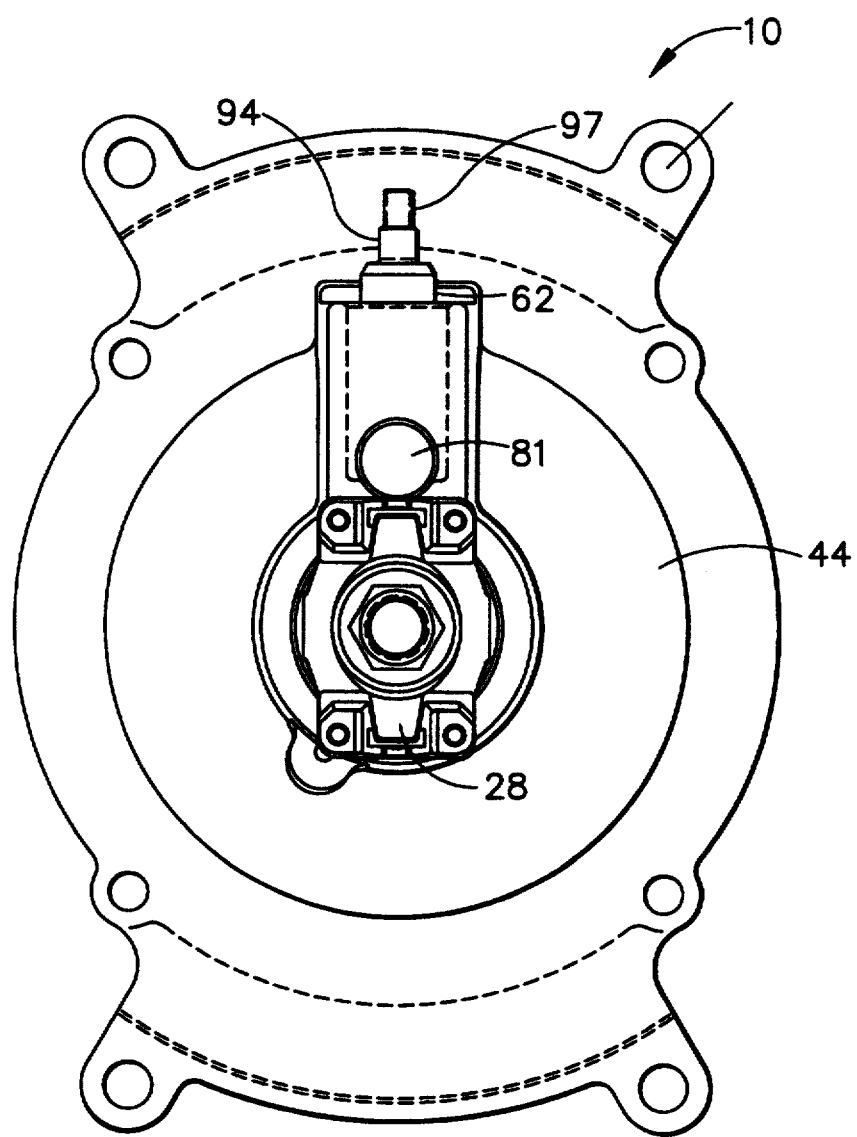
FIG. 3 is an end view taken along line 3—3 in FIG. 1.

Planetary gear set 30 includes a sun gear 32 which is integral with one end of output shaft 22 of motor 14. Sun gear 32 provides the input to planetary gear set 30 and meshingly engages each of a plurality of planet gears 34 which are individually rotatably mounted to a planet carrier 36 by axially extending pins 38. The additional details concerning the manner in which planet gears 34 are mounted to pins 38 and axially restrained, which do not form a part of the present invention, are explained in greater detail in copending and commonly assigned U.S. patent application Ser. No. 08/196,946, filed Feb. 15, 1994, which is herein expressly incorporated by reference. Planet carrier 36 is stationary and is fixedly attached to exterior housing 20 of motor 14 by conventional means such as bolts 40 which secures gear set 30 to motor 14. An inner portion of planet carrier 36 provides support for bearing assembly 26 which in turn supports the end of output shaft 22 which is axially adjacent to gear set 30. Gear set 30 further includes a rotatable ring gear 42 which meshingly engages each of the planet gears 34 and comprises a rotatable output member of gear set 30. Subassembly 12 further includes an end cover structure 44 which encloses gear set 30 and is fixedly attached to planet carrier 36 and exterior housing 20 of motor 14 by conventional means such as studs 46 and nuts 47 as shown in FIG. 2. As shown in FIG. 1, the end cover structure 44 is fixedly attached to a support structure 48 of the vehicle (not shown) by conventional means such as bolts 50 and nuts 51. In this manner, motor 14 and gear set 30 are supported through housing 20 and structure 44 by the vehicle support structure 48. Ring gear 42 has a reduced diameter portion 52 which is rotatably supported within structure 44 by bearing assembly 54 and is torsionally connected to yoke 28 via splined connection 56. The means for lubricating motor 14 and gear set 30, as well as the manner in which stator 16 engages housing 20 do not form a part of the present invention and the reader may refer to a discussion of the motor and inboard gear set of U.S. patent application Ser. No. 08/196,946 for a discussion of these features which may be common to subassembly 12.

Referring now to FIGS. 1 and 3-5, the specific construction of the parking lock mechanism 12 of the present invention will be discussed in greater detail. Mechanism 12 includes a locking pin 58 which is movably mounted in the end cover structure 44 and a cam 62 which is rotatably mounted in the structure 44. Locking pin 58 is mounted within a bushing 59 inserted in an axially extending hole 60 formed in the structure 44. The outside diameter of bushing 59 is slightly greater than the diameter of hole 60 so that bushing 59 engages hole 60 in a diametrical interference fit. Cam 62 includes an inner portion 64 which is in contacting engagement with pin 58. Cam 62 further includes a generally cylindrical intermediate portion 66 mounted within a bushing 68 which is inserted within a generally radially extending hole 70 in the structure 44. In a preferred embodiment, structure 44 comprises a one piece aluminum casting which includes holes 60 and 70. Alternatively, holes 60 and 70 may be formed by machining after structure 44 has been cast. Bushing 68 is preassembled to cam 62 prior to insertion into hole 70 with an inner end of bushing 68 contacting a shoulder 74 formed in the inner portion 64 of cam 62 and an outer end of bushing 68 contacting a snap ring 76 disposed in a groove formed in cylindrical portion 66 of cam 62. Bushing 68 has an outer diameter which is slightly larger than the diameter of hole 70 causing bushing 68 to engage hole 70 in a diametrical interference fit thereby retaining the radial position of bushing 68 within hole 70 after installation. Accordingly, snap ring 76 and shoulder 74 retain cam 62 within bushing 68. Bushing 68 is positioned within hole 70 so that cam 62 protrudes locally above structure 44 by a predetermined distance 78. After cam 62 and bushing 68 have been inserted in hole 70, pin 58 and bushing 59 are inserted in hole 60 with the inner portion 64 of cam 62 providing axial positioning of pin 58. An annular seal 80 is positioned around cam 62 and outward of bushing 68 to prevent debris from entering between bushing 68 and cam 62 and a dust cap 81 is attached to structure 44 so as to close off an outer end of hole 60.

Figure 4A:
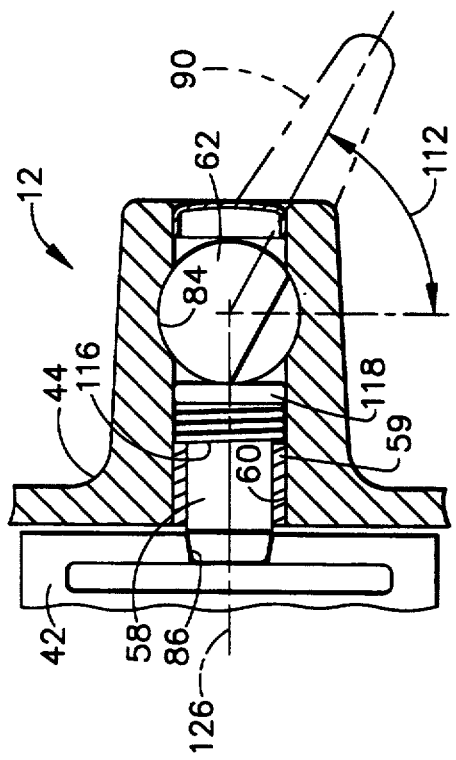
FIG. 4A is a view taken along line 4—4 in FIG. 1 illustrating the parking lock mechanism in a released position.
Figure 4C:
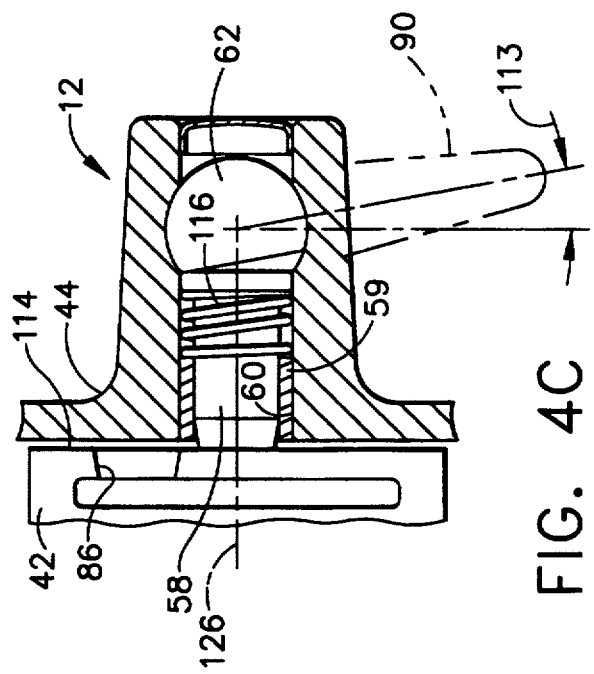
FIG. 4C is a view taken along line 4—4 in FIG. 1 illustrating the parking lock mechanism in a preloaded position.
Figure 4B:
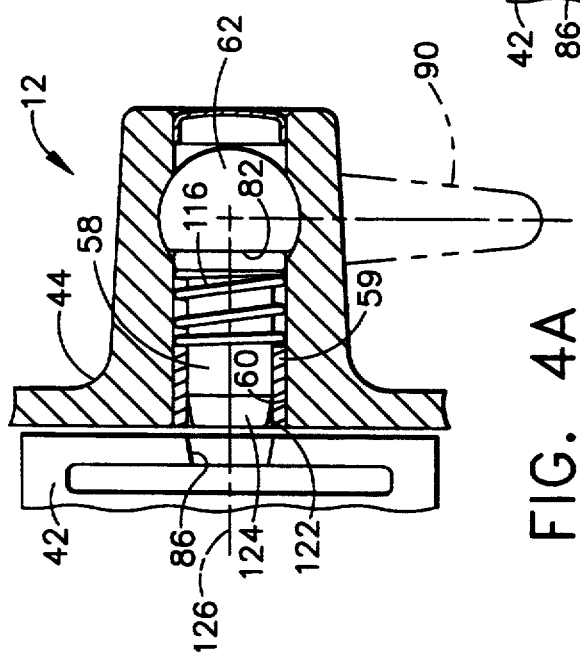
FIG. 4B is a view taken along line 4—4 in FIG. 1 illustrating the parking lock mechanism in an actuated position.

A small annular clearance exists between cylindrical portion 66 and bushing 68 which allows cam 62 to rotate about centerline axis 72 between a released position illustrated in FIG. 4A, and an actuated position illustrated in FIG. 4B. Inner portion 64 of cam 62 is generally D-shaped and includes a substantially flat camming surface 82 which is substantially parallel to longitudinal axis 72 of cam 62. As shown in FIG. 4A, surface 82 is in contacting engagement with pin 58 when cam 62 is in a released position. D-shaped inner portion 64 further includes an arcuate surface 84 which is contacting engagement with pin 58 when cam 62 is in an actuated position. As shown in FIG. 4A, pin 58 is axially spaced from ring gear 42 when cam 62 is in the released position, so as to avoid unnecessary wear to ring gear 42 and pin 58. Ring gear 42 includes a plurality of circumferentially spaced locking holes 86 which may receive locking pin 58 as illustrated in FIG. 4B. When pin 58 is inserted into one of the holes 86, ring gear 42 and yoke 28 are prevented from rotating, thereby avoiding inadvertent and undesired movement of the associated vehicle during periods when motor 14 is not operating. The number of holes 86, and consequently the circumferencial spacing between holes 86, are selected so as to minimize vehicle movement after motor 14 is shut down and before pin 58 engages one of the holes 86. The number of holes 86 is determined, for each application, based upon design parameters which include any reduction gears existing between yoke 28 and the wheel axle (not shown), such as a vehicle differential (not shown), and the diameter of the vehicle tires rotatably coupled to yoke 28.

Figure 5A:
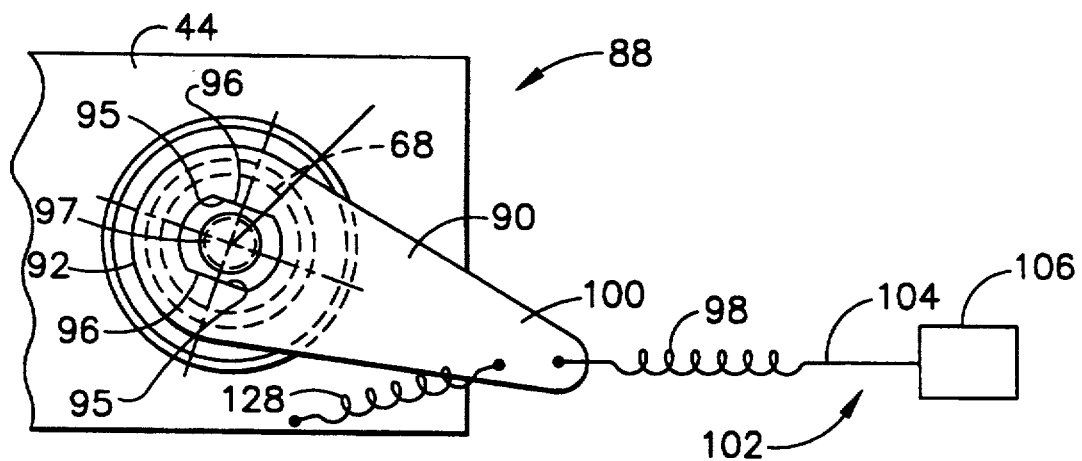
FIGS. 5A, 5B and 5C are plan views taken along line 5—5 in FIG. 1 illustrating alternative actuator means attached to an actuating spring element.
Figure 5B:
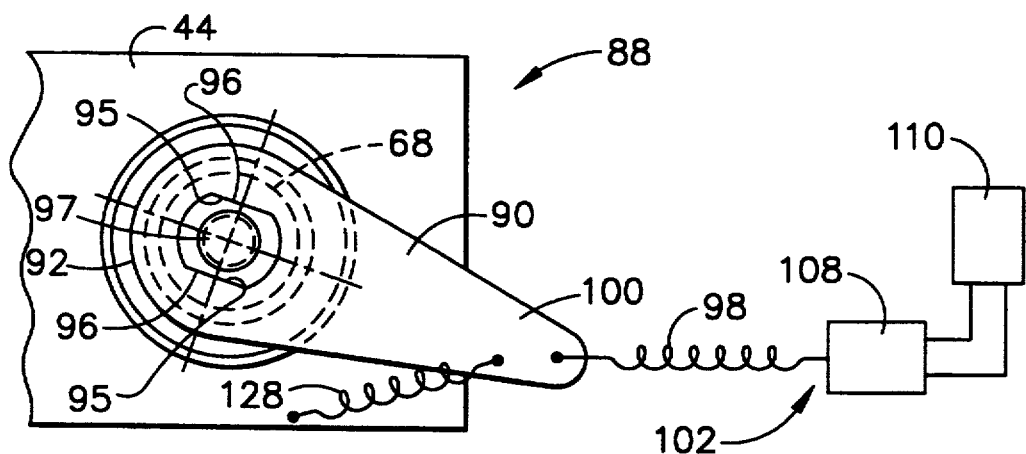
Figure 5C:
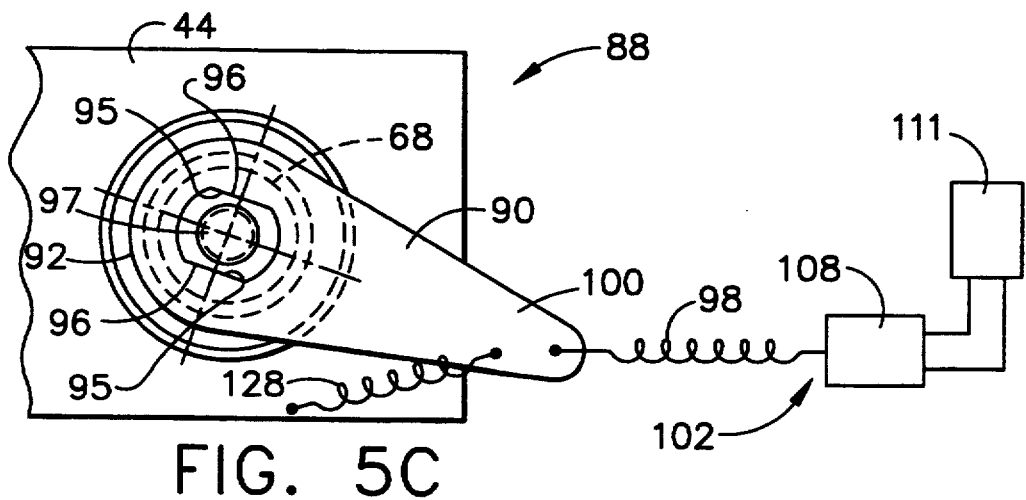

Parking lock mechanism 12 further includes an actuator assembly, indicated generally at 88 in FIGS. 5A, 5B and 5C. Actuator assembly 88 is coupled to cam 62 and applies a torsional load to cam 62 when activated, as discussed in greater detail subsequently. Actuator assembly 88 includes a link 90 which is rotatably coupled to cam 62. Link 90 has a first end 92 which is attached to an outer portion 94 of cam 62. Link end 92 includes an elongated hole, having opposing flat surfaces 95 which engage mating flat surfaces 96 formed on outer portion 94 of cam 62 so as to allow transmission of torque from link 90 to cam 62. Outer portion 94 of cam 62 further includes a threaded outermost portion 97 which receives a nut (not shown) for purposes of securing the attachment of link 90 to cam 62. An actuating spring element 98 of assembly 88 is attached to a second end 100 of link 90. Mechanism 12 further includes an activating means, indicated generally at 102 in FIGS. 5A-5C, for activating actuator assembly 88 by elongating spring element 98 so as to apply a torsional load to cam 62. Activating means 102 may comprise a cable 104 having one end connected to spring 98 and the opposite end connected to an operator controlled lever 106, as illustrated in FIG. 5A. Alternatively, activating means 102 may comprise a solenoid valve 108 which is connected to spring 98 and is activated by an operator controlled switch 110 as illustrated ill FIG. 5B, or by a microprocessor-based electronic control system 111 as illustrated in FIG. 5C. When lever 106 is activated so as to apply a tensile load to cable 104, or when solenoid valve 1{)8 is activated by either switch 110 or electronic control system 111, a force is applied to spring 98 causing spring 98 to elongate and transmit tile applied force to end 100 of link 90 thereby applying a torsional load to cam 62. If one of tile locking holes 86 of ring gear 42 is circumferentially aligned with pin 58 when the torsional load is applied to cam 62, the applied torsional load will cause cam 62 to rotate through a predetermined angle 112 about longitudinal axis 72. Angle 112 is illustrated in FIG. 4B and corresponds to the angle of rotation between released and actuated positions of cam 62. In the illustrated embodiment, angle 112 is at least 62 degrees. Angle 112 is illustrated with respect to a centerline of link 90 which is attached to cam 62 for rotation therewith and angle 112 is determined for each application based on the required axial travel of pin 58 and the assembly stackup tolerances affecting the position of pin 58. With cam 62 rotated by angle 112 from a released position into an actuated position and one of holes 86 aligned with pin 58, cam 62 forces pin 58 into a releasable locking engagement with the aligned one of holes 86, thereby coupling ring gear 42 to structure 44 so as to prevent rotation of ring gear 42. If none of the holes 86 of ring gear 42 are circumferentially aligned with pin 58 when a force is applied to spring 98 via cable 104 or solenoid valve 108, a torque is applied to cam 62 causing cam 62 to rotate slightly through angle 113 about axis 72 from a released position into the preloaded position illustrated in FIG. 4C. With cam 62 in the preloaded position an actuating force remains stored in the elongated spring 98 so that a continuous torsional load is applied to cam 62. The rotation of cam 62 through angle 113, which is substantially smaller in magnitude than angle 112, causes a small axial displacement of pin 58 so that pin 58 is forced into contacting engagement with an axially facing surface 114 of ring gear 42. When one of the holes 86 subsequently becomes aligned with pin 58, the torsional load applied to cam 62 causes cam 62 to rotate from the preloaded position illustrated in FIG. 4C to the actuated position illustrated in FIG. 4B forcing pin 58 into a releasable locking engagement with the aligned one of holes 86. Axial travel of pin 58, between disengaged and engaged positions, is achieved as cam 62 is rotated and camming surface 82 is in contacting engagement with pin 58. When arcuate surface 84 contacts pin 58 additional rotation of cam 62 does not result in incremental axial travel of pin 58. With cam 62 in the actuated position the contact of arcuate surface 84 with pin 58 provides a stable releasable locking engagement of pin 58 with the aligned hole 86 since loads applied to pin 58 will not cause cam 62 to rotate out of the actuated position. Accordingly, it is not necessary to apply additional torsional loads to cam 62 to maintain ring gear 42 in a locked position after pin 58 has been engaged with one of the holes 86. It should be understood that ring gear 42 is free to rotate when locking pin 58 is disengaged from one of the locking holes 86 as illustrated in either FIG. 4A or FIG. 4C.

Parking lock mechanism 12 further includes a means for disengaging locking pin 58 which includes a coil spring 116 which is coaxially mounted about pin 58 within hole 60 and extends between a head 118 formed on pin 58 and bushing 59. Coil spring 116 is compressed when cam 62 is in an actuated position and pin 58 is engaged in one of the holes 86 and the stored force in spring 116 forces pin 58 out of a releasable locking engagement with the engaged one of holes 86 when cam 62 has been rotated to a released position, due to the deactivation of either lever 106 or switch 110. The disengagement of pin 58 from one of the holes 86 is further facilitated by a conical stirface 122 formed on an end 124 of pin 58 which engages one of the locking holes 86. The conical stirface 122 is preferably formed at an angle ranging from 5 degrees to 15 degrees, most preferably 10 degrees, with respect to a centerline axis 126 of pin 58. If pin 58 did not include conical surface 122 frictional forces existing between pin 58 and ring gear 42 as a result of torsional loads applied to ring gear 42 could prevent disengagement of pin 58. Conversely, if conical surface 122 was formed at a relatively large angle relative to axis 126, the ability to maintain a locked position of pin 58 within one of holes 86 would be compromised since torsional loads applied to ring gear 42 would tend to force pin 58 out of engagement with the corresponding hole 86. Accordingly, the cone angle of conical surface 122 represents an important feature of the present invention. The means for disengaging pin 58 further includes a return spring 128 having a first end attached to end 100 of link 90 and a second end attached to structure 44. Return spring 128 causes link 90 and cam 62 to rotate from an actuated position to a released position when either lever 106 or switch 110 is deactivated.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, while the parking lock mechanism has been illustrated in conjunction with a motor and planetary reduction gear set known as a star gear set and having a ring gear as an output member, the parking lock mechanism may be used in conjunction with other motor and reduction gear set assemblies such that the locking pin may be inserted into a rotatable output member other than a ring gear. The invention is therefore not limited to specific preferred embodiments as described but is only limited as defined by the following claims.

What is claimed is:

1. A parking lock mechanism for use in a vehicle drivetrain subassembly having an electric motor coupled to a reduction gear set, the motor contained within a housing and the gear set enclosed by an end cover structure attached to the housing, the gear set including a rotatable output member having a plurality of circumferentially spaced locking holes, said parking lock mechanism comprising:

a locking pin movably mounted in the end cover structure;

a cam rotatably mounted in the end cover structure, said cam having a longitudinal axis and an inner portion in contacting engagement with said pin;

an actuator assembly coupled to said cam;

wherein activation of said actuator assembly applies a torsional load to said cam causing a first predetermined rotation of said cam about said longitudinal axis from a released position to an actuated position when said pin is circumferentially aligned with one of tile locking holes, said first predetermined rotation of said cam urging said pin into releasable locking engagement with the aligned one of the locking holes so as to couple the output member to the end cover structure thereby preventing rotation of the output member, the output member being free to rotate when said locking pill is disengaged from a locking hole;

wherein activation of said actuator assembly applies a torsional load to said cam causing a second predetermined rotation of said cam about said longitudinal axis from a released position to a preloaded position whereby said locking pin is urged into contacting engagement with the output member when all of the locking holes are circumferentially misaligned with said locking pin.

2. The parking lock mechanism as recited in claim 1, wherein said actuator assembly comprises:

a link rotatably coupled to said cam, said link having a first end attached to an outer portion of said cam;

an actuating spring element attached to a second end of said link.

3. The parking lock mechanism as recited in claim 2, further comprising a cable which is attached to said actuating spring element.

4. The parking lock mechanism as recited in claim 2, further comprising a solenoid valve which is attached to said actuating spring element.

5. The parking lock mechanism as recited in claim 2, wherein:

said locking pin is mounted within a bushing inserted in an axially extending hole in the end cover structure;

said locking pin includes a head which is axially spaced from said bushing and which contacts said cam;

said parking lock mechanism further comprises a coil spring coaxially mounted about said locking pin within said axially extending hole and extending between said head of said pin and said bushing.

6. The parking lock mechanism as recited in claim 5, further comprising a return spring element attached to said second end of said link.

7. The parking lock mechanism as recited in claim 6, wherein a conical surface is formed on an end of said locking pin which engages one of the locking holes.

8. The parking lock mechanism as recited in claim 1, wherein:

said cam has an intermediate, generally cylindrical portion mounted within a bushing inserted in a generally radially extending hole in the end cover structure;

said bushing engages said radially extending hole in an interference fit.

9. The parking lock mechanism as recited in claim 8, wherein said inner portion of said cam is generally D-shaped, said D-shaped inner portion including a substantially flat camming surface which is substantially parallel to said longitudinal axis and an arcuate surface.

10. The parking lock mechanism as recited in claim 9, wherein said substantially flat camming surface is in contacting engagement with said locking pin when said cam is in said released position and said arcuate surface is in contacting engagement with said locking pin when said cam is in said actuated position.

* * * * *